United States Patent [19]

Breuninger

[11] 4,393,202

[45] Jul. 12, 1983

[54] METHOD FOR DEWATERING STARCH SLURRIES CONTAINING SWOLLEN STARCH GRANULES RESULTING FROM TREATMENT WITH CATIONIC REAGENTS

[75] Inventor: William F. Breuninger, Greenwood, Ind.

[73] Assignee: National Starch and Chemical Corporation, Bridgewater, N.J.

[21] Appl. No.: 408,987

[22] Filed: Aug. 17, 1982

[51] Int. Cl.$^3$ .................... C08B 31/00; C08B 31/02; C08B 31/08

[52] U.S. Cl. .................... 536/102; 106/210; 106/213; 127/65; 127/67; 127/68; 127/69; 127/70; 127/71; 524/47; 524/50; 524/51; 524/52; 524/53; 536/107; 536/108; 536/109; 536/110; 536/111

[58] Field of Search .................... 536/102, 107–111; 127/65, 67–71; 524/47, 50–53; 106/210, 213

[56] References Cited

U.S. PATENT DOCUMENTS

| | | | |
|---|---|---|---|
| 2,458,191 | 1/1949 | Nichols et al. | 524/53 |
| 2,813,093 | 11/1957 | Caldwell et al. | 536/50 |
| 2,989,520 | 6/1961 | Rutenberg et al. | 536/50 |
| 3,077,469 | 2/1963 | Aszalos | 536/111 |
| 4,061,610 | 12/1977 | Glowaky et al. | 524/52 |
| 4,119,487 | 10/1978 | Tessler | 536/111 |
| 4,194,999 | 3/1980 | Hayashi et al. | 524/52 |
| 4,260,738 | 4/1981 | Tessler | 536/111 |
| 4,345,948 | 8/1982 | Breuninger | 536/102 |

Primary Examiner—Ronald W. Griffin
Attorney, Agent, or Firm—Edwin M. Szala; Ellen T. Dec

[57] ABSTRACT

The production rate and yield resulting from the dewatering of starch conversion products containing swollen starch granules resulting from treatments with cationic reagents is improved by the addition to the starch slurry of a water soluble anionic polymer.

6 Claims, No Drawings

METHOD FOR DEWATERING STARCH SLURRIES CONTAINING SWOLLEN STARCH GRANULES RESULTING FROM TREATMENT WITH CATIONIC REAGENTS

BACKGROUND OF THE INVENTION

This invention relates to an improvement in the processing of starch by the addition of a water soluble anionic polymer to starch slurries containing swollen starch granules resulting from treatment with cationic reagents in order to improve the dewatering of the slurry and thereby increase production rate and yield.

When starch is derivatized with one or more cationic reagents some of the granules become swollen or gelatinized. The presence of these swollen starch granules in the treated starch product reduces dewatering and drying rates and requires increased energy for drying. Moreover, when the treated starch is washed in a continuous centrifugal device such as a Merco the swollen starch granules are removed along with the reaction by-products due to their reduced density with respect to the intact granules. In these cases, while the processing rates are improved by the removal of some of the swollen starch, their removal reduces product yield and also contributes to increased effluent load.

Several synthetic polymers have heretofore been proposed as dewatering aids in processing such treated starch products, however, none to date have showed significant improvement in yields and processing rates when employed on a commercial scale.

In my copending application Ser. No. 282,353 filed July 13, 1981, now U.S. Pat. No. 4,345,948, issued Aug. 24, 1982, I found that the addition of specific cationic polymers to such starch slurries significantly improved the dewatering thereof. While the use of these cationic polymers is generally found to improve the dewatering of any slurry containing swollen starch granules, it has specific utility providing significant improvement in starch slurries resulting from treatment which lead to the production of nonionic or anionic starch derivatives and does not produce as dramatic an improvement in slurries containing derivatives resulting from cationic treatments.

It is therefore an object of the present invention to provide a method for processing treated starch containing swollen starch granules derived from cationic derivatization in order to maintain high processing rates without reducing the yield or increasing the effluent level.

SUMMARY OF THE INVENTION

I have found that the addition of a water soluble anionic polymer substantially increases the dewatering rate and yield of such starch systems during processing while also reducing suspended solids in the effluent.

Among the water soluble anionic polymers useful in the practice of this invention are included the homo- and copolymers of alkali metal styrene sulfonates, the alkali metal and ammonium salts of copolymers of styrene and substituted styrenes with maleic acid; homo- and copolymers of sulfoalkyl acrylates and carboxylalkyl acrylates such as sodium sulfoethyl acrylate and sodium carboxyethyl acrylate; carboxylalkyl cellulose ethers such as carboxymethyl cellulose, carboxymethyl methyl cellulose, carboxymethyl hydroxyethyl cellulose and similar derivatives of other polysaccharides such as starch. Also useful herein are the anionic derivatives of starch such as are prepared when carboxyalkyl, sulfoalkyl, sulfocarboxyalkyl and phosphate groups are attached to the starch through ether or ester linkages or when carboxyl groups are introduced onto the starch by oxidation. Additionally, water-soluble or water-insoluble mono-ethylenically unsaturated monomers copoylymerizable with one of the foregoing anionic comonomeric functionalities may be employed to produce water-soluble anionic polymers. When water insoluble comonomers are employed, they are used in amounts insufficient to impair the water-solubility of the resulting copolymer. Common comonomers include acrylamide, methacrylamide, acrylonitrile, methacrylonitrile, styrene, vinyl acetate, vinyl toluene, methyl acrylate, N-vinyl oxazolidinone, and N-vinyl pyrrolidone.

It is difficult to establish the exact amount of anionic polymer required to give the beneficial results disclosed herein. The specific amount will depend, in part, upon the level of gelatinized cationic starch in the slurry as well as the molecular weight and charge density of the anionic polymer. I have found levels as low as about 0.01%, by weight of the starch solids to be extremely effective in some application while levels as high as about 0.5% were useful in others. Levels above about 0.5% would probably not be required in most commercial applications and use of such quantities is economically undesirable.

Virtually any starch base treated with conventional cationic conversion techniques results in the formation of some swollen granules and therefore will benefit from processing in accordance with the present invention. Thus, applicable starch materials which may be so processed are the conversion products derived from any plant source including corn, potato, sweet potato, wheat, rice, sago, tapioca, waxy maize, sorghum, high amylose corn or the like. Typical conversion products include, for example, starches prepared through an etherification or esterification reaction with any reagent which will introduce into the starch a cationic group containing nitrogen, sulfur or phosphorus. Examples of such groups are the tertiary amine and quaternary ammonium, sulfonium and phosphonium groups. In particular are those starch derivatives resulting from the reaction of starch, under alkaline conditions, with a dialkyl amino alkyl epoxide or dialkyl amino alkyl halide or the corresponding compounds containing aryl groups in addition to the alkyl groups. These particular derivatives are described in U.S. Pat. No. 2,813,093. Other derivatized starch slurries which may benefit from the teachings herein include those resulting from the reaction of starch with a beta-halogen alkyl sulfonium salt, vinyl sulfonium salt or epoxyalkyl sulfonium salt as taught in U.S. Pat. No. 2,989,520 or from the reaction of starch with a beta-helogenoalkyl phosphonium salt as taught in U.S. Pat. No. 3,077,469.

The most commonly employed continuous centrifugal washing device used in substantially all the commercial processing of starch conversion products is the Merco Centrifuge (available from Dorr-Oliver Inc., Stamford, Conn.). In utilizing this equipment to wash starch in accordance with the invention, the wash liquor moves inward against an outward movement of starch particles, efficiently stripping them of contaminating soluble material yet retaining the swollen starch granules within the system. Also contemplated herein is the use of the water soluble anionic polymers in processing operations which do not necessarily require washing or the use of centrifugal type washing equipment but where the starch slurry is merely dewatered by filtration and dried.

When the swollen starch granules are thus retained with the starch being processed there is no increase in drying energy required while there is an improvement in processing rate and yield accompanied by a reduction in effluent load. These novel benefits of the processing technique of the present invention will be shown in the examples which follow.

In order to better demonstrate the efficacy of the teachings of the invention, the examples are based on a synthetically formulated "problem" starch slurry. A series of test systems were made by combining 0.5 grams gelatinized cationic starch containing 0.31% nitrogen from derivatization with diethylaminoethyl chloride hydrochloride with 100 grams cationic starch containing 0.30–0.33% nitrogen also from derivatization with diethylaminoethyl chloride hydrochloride, the latter starch not containing any appreciable quantity of gelatinized starch. Water was then added to the starch to make a total volume of 750 ml. and, to this system, was added the particular anionic material to be evaluated at the levels indicated.

EXAMPLE I

The sodium salt of sulfonalted polystyrene having a molecular weight of approx. 500,000 was used at two concentrations as a dewatering aid in the treatment of the synthetic cationic starch slurry previously described. After mixing for fifteen minutes, the samples were poured into a settling cone. Settling was noted (in millimeters) with respect to the supernatant on top of the granular starch sediment at intervals over a period of about 30 minutes.

| Polymer conc. | 2 min. | 5 min. | 10 min. | 25 min. | 30 min. |
|---|---|---|---|---|---|
| 0 (control) | 2 | 12 | 23 | 37 | 48 |
| 0.04% | 3 | 15 | 28 | 48 | 53 |
| 0.4% | 15 | 32 | 47 | 65 | 86 |

After 23 hours, the supernatant liquid was carefully decanted and the upper layer of high hydrated sediment was examined under a microscope (480X). The control sample showed a high concentration of swollen starch granules on the surface of the cake. No swollen starch was visually observed in either of the samples treated with the anionic polymer although, on microscopic analysis, the sample prepared with 0.04% polymer showed some swollen starch.

In order to confirm that the presence of any residual anionic polymer would not affect the efficiency of the resultant recovered cationic starch derivative, samples of the starches recovered from the above series of tests were submitted for pigment retention testing. The sample which had been treated with 0.04% polymer gave a 93.2% retention value (expressed as a percent of the standard); the sample treated with 0.4% polymer gave a 92.8% value and the control sample a 93.5%, thus indicating little or no reduction in cationic properties resulting from the recovery treatment.

EXAMPLE II

Another series of tests were run using the synthetic slurry described above and a variety of anionic polymers based on sulfonated polystyrene. The following polymers were tested at 0.4% addition levels:

Sodium salt of sulfonated copolymer of sytrene/maleic anhydride (M.W. 5000)
Sodium salt of sulfonated polystyrene (M.W. 70,000)
Sodium salt of sulfonated polystyrene (M.W. 500,000)
Sodium salt of sulfonated polystyrene (M.W. >6 million)

After allowing the test samples to stand for 22 hours, the surface of the formed cake was studied under a microscope and it was found that the samples which had been treated with the anionic polymers had virtually no swollen starch granules on its surface while the control sample which was not treated with the polymer exhibited a one millimeter thickness of swollen granules on the surface. This finding is important to the benefits provided by the instant invention since, in normal processing of starch under commercial operations, swollen starch granules often coat the starch cake and blind the filter cloth, thereby reducing dewatering rate and hence overall processing rates. By use of the additive as described herein, the swollen starch granules which are present remain distributed throughout the filter cake by virtue of the increased speed with which they settle, rather than becoming concentrated on the surface of the centrifuge cake as is observed in the control sample where the unswollen starch granules preferentially settle out of the slurry at a substantially faster rate.

EXAMPLE III

Similar tests were performed using a variety of water soluble anionic polymers. The nature of the polymers and the sediment results observed are shown below. Also noted is the height in millimeters of swollen starch on the test samples after allowing the cake to settle for 3 hours 15 minutes.

| Polymer | Conc. | 2 min. | 5 min. | 10 min. | 25 min. | Height of swollen starch |
|---|---|---|---|---|---|---|
| Carboxylated Polyacrylamide (Intrinsic Viscosity 12–40 wt % carboxyl content) | 0.1% | 17 | 32 | 49 | 77 | 0 |
| Carboxylated Polyacrylamide (Intrinsic Viscosity 11.7–20% carboxyl content) | 0.1% | 30 | 43 | 54 | 80 | 0 |
| Carboxylated Polyacrylamide (Intrinsic Viscosity 11.7–20% carboxyl content) | 0.01% | 35 | 48 | 65 | 86 | 2 |
| Kelgin MV (Sodium Alginate) | 0.1% | 7 | 16 | 30 | 60 | 1 |
| Carboxymethyl cellulose | 0.1% | 12 | 25 | 45 | 83 | <1 |
| Control | 0 | 4 | 7 | 14 | 49 | 13 |

EXAMPLE IV

Three other anionic polymers were tested at different concentration levels to determine their effectiveness in the present invention.

The first polymer (designated Polymer A) was prepared by treating corn starch with 10% N-(ethyl-N-(2-bromoethyl) aminomethylphosphonic acid (0.26% nitrogen or dry bases) as taught in U.S. Pat. No. 4,243,479.

The second polymer (Polymer B) was prepared by treating waxy maize with 15% 3-chloro-2-sulfopropionic acid (2.25% sufocarboxyethyl ether or dry basis) as taught in U.S. Pat. No. 4,119,487.

The starch sample designated Polymer C is an amylopectin sulfate having a D.S. of 1.5.

The testing procedure as described in Example I was repeated with the described polymers at the indicated concentrates.

The polymers, amounts and settling test results are shown below:

| Polymer | Conc. | 2 min. | 5 min. | 10 min. | 15 min. | 45 min. |
|---|---|---|---|---|---|---|
| A | 0.25% | 5 | 6 | 14 | 23 | 44 |
| B | 0.4% | 30 | 51 | 67 | 84 | 102 |
| B | 0.1% | 29 | 52 | 70 | 88 | 105 |
| C | 0.05% | 17 | 39 | 61 | 84 | 108 |
| C | 0.25% | 10 | 23 | 45 | 75 | 111 |
| Control | 0 | 3 | 5 | 11 | 16 | 34 |

Summarizing, it is seen that the addition of minor amounts of water soluble anionic polymers substantially improves the processing rate and yield of starch conversion products containing swollen starch granules resulting from the treatment with cationic polymers.

Variations may be made in the proportions, procedures, and materials without departing from the scope of this invention which is defined by the following claims.

What is claimed is:

1. In a process for dewatering starch conversion products containing swollen starch granules resulting from treatment with cationic reagents, the improvement which comprises adding to the starch slurry a water soluble anionic polymer, thereby increasing the production rate and yield while reducing suspended solids in the effluent.

2. The process of claim 1 wherein the water soluble anionic polymer is selected from the group consisting of homo- and copolymers of alkali metal styrene sulfonates, alkali metal and ammonium salts of high copolymers of styrene and substituted styrene with maleic acid; homo- and copolymers of sulfoalkyl acrylates and carboxyalkyl acrylates; and carboxyalkyl cellulose ethers.

3. The process of claim 1 wherein the water soluble anionic polymer is an anionic derivative of starch prepared by the etherification or esterification of starch with carboxyalkyl, sulfoalkyl, sulfocarboxyalkyl and/or phosphate groups.

4. The process of claim 1 wherein the water soluble anionic polymer is used in an amount of 0.01–0.5% by weight, based on the weight of starch solids.

5. The process of claim 1 wherein the water soluble anionic polymer is a homo or copolymer polystyrene.

6. The process of claim 1 wherein the starch conversion products are dewatered by washing in a continuous certifugal device.

* * * * *